Patented Nov. 5, 1935

2,019,666

UNITED STATES PATENT OFFICE 2,019,666

METHOD OF OBTAINING TETRAPHOSPHATES

Augustus H. Fiske, Warren, and Charles S. Bryan, Providence, R. I., assignors to Rumford Chemical Works, Rumford, R. I.

No Drawing. Application January 22, 1935, Serial No. 2,922

13 Claims. (Cl. 23—106)

Our invention relates particularly to an advantageous method for the production of tetraphosphates, and especially tetraphosphates of the alkali metals.

The object of our invention is to provide a process that is advantageous and inexpensive, as well as expeditious, for producing tetraphosphates, and particularly the alkali metal tetraphosphates. The tetraphosphates to which we refer are the salts of the tetraphosphoric acid discovered by Fleitmann and Henneberg in 1848 and having the following constitution, as set forth by Roscoe and Schorlemmer in their Treatise on Chemistry, vol. 1, Macmillan & Co., Ltd., 1905, page 656,—

Tetraphosphoric acid

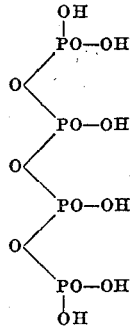

This is not to be confused with the so-called "tetraphosphate" fertilizer discovered by Stoppani in 1911, and which was made by heating the carbonates of sodium, magnesium, calcium and sulphate of sodium with natural mineral phosphates to a temperature of about 600° C., a process developed to make the mineral phosphate merely available as a plant food. The product made by Stoppani was doubtless called "tetraphosphate" because of the fact that four ingredients were used in its preparation, in addition to the mineral phosphate present, and the name applied thereto was evidently merely a trade term, his product being understood to be a double orthophosphate of calcium and sodium. The tetraphosphates produced by Fleitmann and Henneberg have the general formula $R_6P_4O_{13}$, where R signifies the base, and were made up then by fusing together pyrophosphates and metaphosphates, also orthophosphates and metaphosphates. Also, sodium tetraphosphate is referred to in the British patent to Patten, No. 8,197 of 1901, as being made by a reaction between sodium bicarbonate and acid sodium pyrophosphate. Also, according to Chem. Ztg., Rakuzin & Arseneev, 1923, pages 47, 195, prepared tetraphosphoric acid, $H_6P_4O_{13}$, and the salts forming the subject matter of the present application, are the salts of the acid there referred to.

While our invention is capable of being carried out in different ways, for the purpose of illustration we shall describe only certain procedures in connection with the same, by way of example.

We have discovered that when an alkali metal pyrophosphate, as, for instance, an alkali metal salt of pyrophosphoric acid, as, for example, acid sodium pyrophosphate, $Na_2H_2P_2O_7$, is heated with an alkali metal base, sodium tetraphosphate is obtained. For example, we may mix together acid sodium pyrophosphate, $Na_2H_2P_2O_7$, in dry powdered form or the corresponding potassium salt with an alkali metal base, such as sodium hydroxide in dry powdered form or oxide thereof or any corresponding potassium compound, and then heat to 150° C. or higher, but preferably to a red heat, a reaction takes place in accordance with the following equation:

$$2Na_2H_2P_2O_7 + 2NaOH = Na_6P_4O_{13} + 3H_2O$$

the product obtained being sodium tetraphosphate, which is a homogeneous white stable powder of uniform composition. The proportions of the materials used in producing the tetraphosphate are the theoretical proportions, although, of course, if impurities are present a suitable allowance will be made for the same in the commercial compounds used. In the above examples it is to be understood, also, that tetraphosphates containing sodium and potassium, as, for example, mixed sodium and potassium tetraphosphates, can be obtained where any one of the reacting compounds is the sodium compound and the other compound reacting therewith is the potassium compound.

Furthermore, it has been found that monosodium metaphosphate, $NaPO_3$, or some of its polymeric forms, either alone or mixed with sodium pyrophosphate, $Na_4P_2O_7$, is valuable as a solvent for calcium or magnesium salts and has, accordingly, been used for the softening of water and other similar purposes. We have found, however, that the tetraphosphates are considerably more valuable and effective than the metaphosphates and admixtures thereof, as the same or better results can be obtained with the tetraphosphates such as are made in accordance with our invention, by using only three fourths as much of the tetraphosphate by weight as compared with the amount of metaphosphate or other admixtures previously used. Undoubtedly the value of the said tetraphosphates in this connection, for instance in the case of the treatment of water containing dissolved calcium or magnesium compounds or both, arises largely from decreasing the concentration of the calcium or magnesium ion or both in solutions to which the tetraphosphates are added, or, in other words, by causing the calcium and magnesium ion present in the water to be brought into very slightly ionized soluble chemical compounds with the tetraphosphates. In other words, we have found that the tetraphosphates made in accordance with our invention have properties of superior value in connection with the following uses, for example:

As a water softener by keeping the alkali earth bases in a soluble condition.

In laundries to save soap by combining with the alkali earth bases in the washing water.

In deliming leather as in the tanning industry.

In dissolving the lime compounds which may occur in soiled textiles.

To prevent deposits of alkali earth salts forming in hot water systems.

To prevent deposits of alkali earth compounds in steam boilers and their feed lines.

To prevent deposits of alkali earth bases as precipitates in the water to be frozen in artificial ice machines.

To prevent the formation of alkali earth precipitates on the outside of cans from the cooling water of the canning industry.

To prevent streaky dyeing in textiles by keeping any alkali earth compounds in a condition of solubility.

Preventing the formation of soap spots on the cloth in dyeing.

To clean cement or brick walls from lime deposits.

As a softener for water in washing living animals or in baths for human beings.

For cleaning or washing dishes.

For softening water in which anything may be washed and thus saving soap.

Washing rayon, for instance.

Scouring wool.

Kier boiling in bleacheries.

Boiling off silk.

Causing increased penetration of dye in textiles by cleaning off traces of alkali earth compounds.

While we have described our invention above in detail we wish it to be understood that many changes may be made therein without departing from the spirit of the same.

We claim:

1. A process which comprises producing a tetraphosphate by a reaction of an alkali metal acid pyrophosphate with an alkali metal base by heating them to a reacting temperature in approximately their theoretically reacting proportions so as to produce a tetraphosphate.

2. A process which comprises producing a tetraphosphate by a reaction of an alkali metal acid pyrophosphate with a sodium base by heating them to a reacting temperature in approximately their theoretically reacting proportions so as to produce a tetraphosphate.

3. A process which comprises producing a tetraphosphate by a reaction of an alkali metal acid pyrophosphate with a potassium base by heating them to a reacting temperature in approximately their theoretically reacting proportions so as to produce a tetraphosphate.

4. A process which comprises producing a tetraphosphate by a reaction of an alkali metal acid pyrophosphate with sodium hydroxide by heating them to a reaction temperature in approximately their theoretically reacting proportions so as to produce a tetraphosphate.

5. A process which comprises producing a tetraphosphate by a reaction of an alkali metal acid pyrophosphate with potassium hydroxide by heating them to a reacting temperature in approximately their theoretically reacting proportions so as to produce a tetraphosphate.

6. A process which comprises producing a tetraphosphate by a reaction of a sodium acid pyrophosphate with a sodium base by heating them to a reacting temperature in approximately their theoretically reacting proportions so as to produce a tetraphosphate.

7. A process which comprises producing a tetraphosphate by a reaction of a sodium acid pyrophosphate with sodium hydroxide by heating them to a reacting temperature in approximately their theoretically reacting proportions so as to produce a tetraphosphate.

8. A process which comprises producing a tetraphosphate by a reaction of a potassium acid pyrophosphate with a potassium base by heating them to a reacting temperature in approximately their theoretically reacting proportions so as to produce a tetraphosphate.

9. A process which comprises producing a tetraphosphate by a reaction of a potassium acid pyrophosphate with potassium hydroxide by heating them to a reacting temperature in approximately their theoretically reacting proportions so as to produce a tetraphosphate.

10. A process which comprises producing a tetraphosphate by a reaction of sodium acid pyrophosphate with a potassium base by heating them to a reacting temperature in approximately their theoretically reacting proportions so as to produce a tetraphosphate.

11. A process which comprises producing a tetraphosphate by a reaction of potassium acid pyrophosphate with a sodium base by heating them to a reacting temperature in approximately their theoretically reacting proportions so as to produce a tetraphosphate.

12. A process which comprises producing a tetraphosphate by a reaction of sodium acid pyrophosphate with potassium hydroxide by heating them to a reacting temperature in approximately their theoretically reacting proportions so as to produce a tetraphosphate.

13. A process which comprises producing a tetraphosphate by a reaction of potassium acid pyrophosphate with sodium hydroxide by heating them to a reacting temperature in approximately their theoretically reacting proportions so as to produce a tetraphosphate.

AUGUSTUS H. FISKE.
CHARLES S. BRYAN.